A. KINGSBURY.
BEARING.
APPLICATION FILED OCT. 8, 1917.
1,403,694.
Patented Jan. 17, 1922.
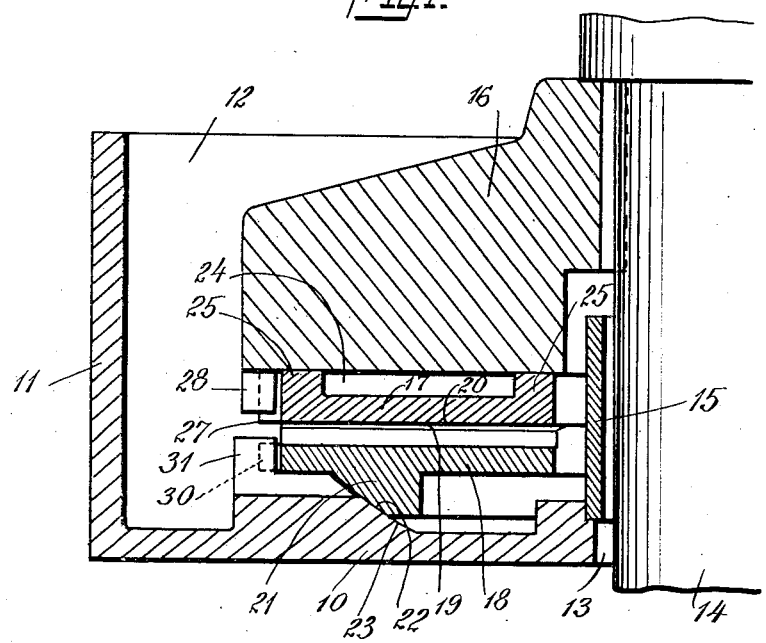
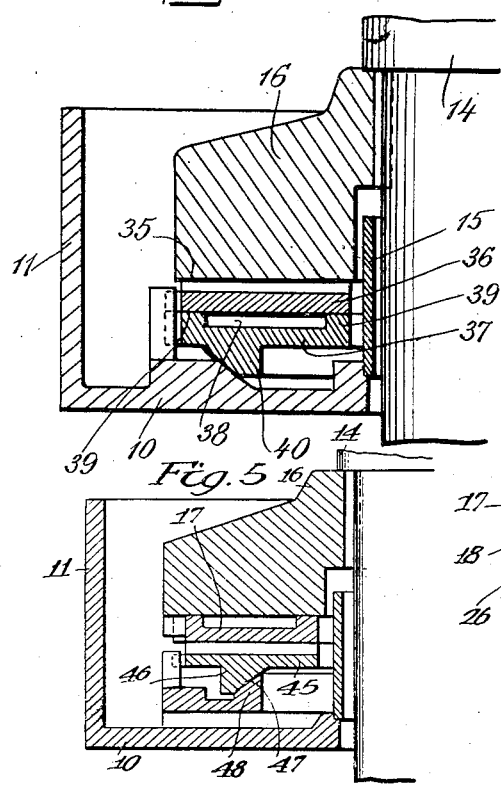
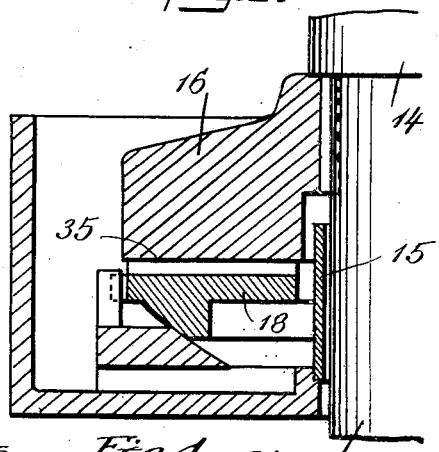
Inventor
Albert Kingsbury
By his Attorneys
Marshall & Dearborn

UNITED STATES PATENT OFFICE.

ALBERT KINGSBURY, OF PITTSBURGH, PENNSYLVANIA.

BEARING.

1,403,694.   Specification of Letters Patent.   Patented Jan. 17, 1922.

Original application filed April 10, 1917, Serial No. 160,941. Divided and this application filed October 8, 1917. Serial No. 195,239.

*To all whom it may concern:*

Be it known that I, ALBERT KINGSBURY, a citizen of the United States of America, and a resident of Pittsburgh, Allegheny County, and State of Pennsylvania, have invented certain new and useful Improvements in Bearings, of which the following is a specification, reference being had to the accompanying drawings, forming a part thereof.

My invention relates to bearings, and particularly to thrust bearings which comprise annular bearing members having plane or segmental thrust surfaces.

In my copending application Serial No. 160,941 filed April 10, 1917, I have disclosed and claimed broadly bearing structures of the same general type, and my present application which is a division of the aforesaid application is directed to embodiments of the generic invention which are not claimed specifically therein.

One object of my invention is to provide supports for the respective bearing members which cooperate therewith to overcome the tendency for the edges of the annular bearing members to separate due to the normal heating of the bearing in operation.

Another object of my invention is to provide means for maintaining a substantially equal distribution of pressure on the bearing surfaces of bearing members one or both of which is flexible by supporting one of the bearing members on an annular projection which is offset slightly in an outward direction from the mean radius of the member. Another object of my invention is to provide a bearing comprising cooperating flexible bearing members having means for mounting the same whereby they may flex radially to maintain uniform pressure engagement.

In order that my invention may be thoroughly understood I will now proceed to describe the same in the following specification and then point out the novel features thereof in appended claims. The invention is capable of receiving a variety of mechanical expressions, some of which are shown on the accompanying drawing, but it is to be expressly understood that the drawing is for purposes of illustration only and is not to be construed as a definition of the limits of the invention, reference being had to the appended claims for that purpose.

Referring to the drawings:

Figure 1 is a partial sectional elevation of a thrust bearing arranged and constructed in accordance with my invention, and constituting an embodiment thereof.

Figures 2 and 3 are views corresponding to Figure 1, but drawn to a slightly smaller scale, showing structures which also embody my invention.

Figure 4 is a sectional detail of the structure shown in Figure 1.

Figure 5 is a view corresponding to Figure 1, of a modified arrangement in which one of the bearing members is supported near its edges and the other near its medial line.

In the form shown in Figures 1 and 4, 10 designates a base which may be mounted on any suitable foundation (not shown) and which has an upwardly extending flange 11, to form the outer wall of an annular oil reservoir 12, a central hole or opening 13 being provided through which a shaft 14 extends and a sleeve 15 loosely surrounding the shaft and completing the annular oil reservoir 12.

A thrust block 16 is secured to the shaft in any suitable way and has a thrust collar 17 mounted thereon.

A relatively-thin flexible bearing ring 18, provided with a segmental bearing surface 19, which cooperates with the bearing surface 20 of the thrust collar, is supported by an annular projection 21 which has a spherically curved surface 22 in engagement with the correspondingly curved supporting surface 23 of the base.

The thrust collar 17 is provided with a recess 24 opposite its bearing surface so that the collar engages the thrust block near its edges where annular projections 25 are formed.

The bearing surface of one or both of the bearing members is provided with radial slots 26 as clearly shown in Figure 4 and the surface is beveled or inclined slightly at one or both the edges of the slots in order that oil may be wedged between the bearing surfaces when the bearing is in operation.

The thrust collar 17 has an outwardly extending lug 27 which cooperates with a lug 28 on the thrust block and insures that the thrust collar shall follow the motion of the block and the shaft to which the block is secured.

The bearing ring 18 is prevented from rotation by an outwardly extending lug 30 cooperating with a lug 31 on the base.

The cooperating spherical supporting surfaces 22 and 23 enable the bearing ring 18 to automatically seat itself in position to engage the bearing surface of the thrust collar 17.

The projection 21 is offset outwardly from the mean radius of the ring for the purpose of counteracting the tendency of a greater pressure to exist near the inner edge of the bearing members when the bearing is in operation.

This tendency arises from the normal heating of the members in operation which causes their expansion and tends to distort them so as to separate that portion of the bearing surfaces which is near their outer edges and increase the pressure at that portion which is near their inner edges.

In the structure illustrated there is a like tendency due to the radial component of the active forces which are exerted upon the spherically curved surface 22 of the bearing ring, so that the supporting projection should be offset sufficiently to counteract both of these tendencies.

In the form shown in Figure 2 the thrust block 16 has a bearing surface 35 which cooperates with a relatively thin bearing ring 36. This ring has a top surface like the surface of the ring 18 but, instead of being provided with a projection, it is supported by a flexible annular carrier 37 having a central groove 38, which produces a pair of annular projections 39 on which the ring 36 rests, and a downwardly extending projection 40 which corresponds to the projection 21.

Figure 3 shows a structure which is very similar to Figure 1 and differs therefrom only in that the thrust collar 17 is removed and the ring 18 cooperates directly with the bearing surface 35 of the thrust block 16, like parts being designated by the same reference characters in all the figures.

Referring to Figure 5, the structure here shown is like that of Figure 1, except that a bearing member 45 is substituted for the member 18 and is provided with a downwardly extending narrow annular projection 46 which has a concave spherical surface 47 which corresponds to the convex surface 22. The base is provided with a supporting projection 48 which is spherically curved to cooperate with the surface 47. In this case the support is not offset outwardly because the reaction, instead of acting in conjunction with the tendency due to the heating of the bearing, acts in opposition thereto and tends to counteract it.

This structure embodies the other feature of my invention, viz., the combination of cooperating flexible bearing elements in which one is supported near its edges and one near its medial line.

While the embodiments of the invention illustrated on the drawing have been described with considerable particularity it is to be understood that the invention is not restricted thereto as changes may be made in form, arrangement and proportion of parts, the flexible bearing members may be interchanged, and some of the inventive features used without the employment of others, without departing from the spirit of this invention. Reference is therefore to be had to the claims hereto appended for a definition of the limits of this invention.

What I claim is:

1. A bearing comprising a member having a bearing surface and supported annularly near its edges, and a cooperating bearing member supported annularly near its medial line.

2. A bearing comprising an annular member having a bearing surface and having annular supporting projections near its edges, a cooperating bearing member having an annular supporting projection near its medial line, and a member on which the last-named annular projection is mounted.

3. A bearing comprising an annular member having a bearing surface and having annular supporting projections near its edges, a cooperating bearing member having an annular supporting projection near its medial line, and a member on which the last-named annular projection is mounted, the cooperating surfaces of the medial annular projection and the base being spherically curved so that the member is self-adjustable.

4. A thrust bearing comprising a flexible thrust collar having an annular bearing surface and an annular supporting projection offset slightly from the mean radius of the collar.

5. A thrust bearing comprising a flexible thrust collar having an annular bearing surface and an annular supporting projection offset outwardly from the mean radius of the collar.

6. A thrust bearing comprising a flexible thrust collar having an annular support provided with a spherically curved supporting surface, and means offset slightly from the mean radius adapted to cooperate with said curved supporting surface.

7. A thrust bearing comprising a flexible thrust collar having an annular support, outwardly offset from the mean radius and provided with a spherically curved supporting surface, and a member provided with a correspondingly curved surface on which the spherically curved supporting surface of the collar is mounted.

8. A bearing comprising a flexible member having a bearing surface and supported annularly near its edges, and a cooperating bearing member supported annularly near its medial line.

9. A thrust bearing comprising a flexible thrust collar having an annular bearing surface and supported at a position offset slightly from the mean radius of the collar.

10. A thrust bearing comprising a flexible thrust collar having an annular bearing surface and supported at a position offset outwardly from the mean radius of the collar.

11. A bearing comprising a flexible annular member having a bearing surface and having annular supporting projections near its edges, a cooperating bearing member having an annular supporting projection near its medial line, and a member on which the last-named annular projection is mounted.

12. A bearing comprising a flexible annular member having a bearing surface and having annular supporting projections near its edges, a cooperating bearing member having an annular supporting projection near its medial line, and a member on which the last-mentioned annular projection is mounted, the cooperating surfaces of the medial annular projection and said member being spherically curved so that the member is self-adjustable.

13. A bearing comprising a flexible bearing member supported annularly near its edges, and a cooperating flexible bearing member supported annularly near its medial line.

14. A bearing comprising a flexible bearing member having annular supporting projections near its edges, and a cooperating flexible bearing member having an annular supporting projection near its medial line.

15. A bearing comprising a flexible bearing member having annular supporting projections near its edges, and a cooperating flexible bearing member having an annular supporting projection near its medial line, said last-named annular projection having a spherical supporting surface.

16. A bearing comprising a bearing member supported annularly near its edges, and a cooperating flexible bearing member supported annularly near its medial line.

17. A bearing comprising a bearing member having annular supporting projections near its edges, and a cooperating flexible bearing member having an annular supporting projection near its medial line.

18. A bearing comprising a bearing member having annular supporting projections near its edges, and a cooperating flexible bearing member having an annular supporting projection near its medial line, said last-named annular projection having a spherical supporting surface.

19. A bearing comprising a bearing member having annular supporting projections near its edges, and a cooperating bearing member having an annular supporting projection near its medial line, and means cooperating with one of said bearing members to provide a spherical mounting therefor.

20. A bearing comprising a flexible bearing member having annular supporting projections near its edges, and a cooperating flexible bearing member having an annular supporting projection near its medial line, and means cooperating with one of said bearing members to provide a spherical mounting therefor.

21. A bearing comprising a bearing member supported annularly near its edges, a cooperating member supported annularly near its medial line, and coacting spherical surfaces by which one of said bearing members is mounted.

22. A bearing comprising a bearing member supported annularly near its edges, a cooperating member supported annularly near its medial line, and coacting spherical surfaces by which said last-named bearing member is mounted.

23. A bearing comprising a flexible bearing member supported annularly near its edges, a cooperating flexible member supported annularly near its medial line, and coacting spherical surfaces by which one of said bearing members is mounted.

24. A bearing comprising a flexible bearing member supported annularly near its edges, a cooperating flexible member supported annularly near its medial line, and coacting spherical surfaces by which said last-named bearing member is mounted.

25. A bearing comprising a flexible bearing member supported annularly near its edges, a cooperating member having an annular supporting projection near its medial line, and coacting spherical surfaces by which said last-named bearing member is mounted.

In witness whereof I have hereunto set my hand this 4th day of October, 1917.

ALBERT KINGSBURY.